(12) United States Patent
Konishi

(10) Patent No.: US 9,194,524 B2
(45) Date of Patent: Nov. 24, 2015

(54) RAPID-CONNECT COUPLER WITH VENT-STOP

(75) Inventor: Howard M. Konishi, Kirkland, WA (US)

(73) Assignee: Engineered Controls International, LLC, Elon, NC (US)

( * ) Notice: Subject to any disclaimer, the term of this patent is extended or adjusted under 35 U.S.C. 154(b) by 375 days.

(21) Appl. No.: 13/426,377

(22) Filed: Mar. 21, 2012

(65) Prior Publication Data

US 2012/0280493 A1    Nov. 8, 2012

Related U.S. Application Data

(60) Provisional application No. 61/454,696, filed on Mar. 21, 2011.

(51) Int. Cl.
*F16L 37/23*    (2006.01)
*F16L 37/36*    (2006.01)
(Continued)

(52) U.S. Cl.
CPC ............... *F16L 37/36* (2013.01); *F16L 37/12* (2013.01); *F16L 37/42* (2013.01); *F16L 37/23* (2013.01); *F17C 2205/037* (2013.01); *Y10T 137/0402* (2015.04); *Y10T 137/598* (2015.04); *Y10T 137/87957* (2015.04)

(58) Field of Classification Search
CPC ........... F16L 37/23; F16L 37/30; F16L 37/32; F16L 37/36; F16L 37/38; F16L 37/42; F16L 37/12; F17C 2205/037; Y10T 137/87957

USPC .......... 251/149, 149.1, 149.6, 149.9, 148, 98, 251/95, 89; 137/614.04; 285/1, 23, 33, 91, 285/309–312, 316, 924
See application file for complete search history.

(56) References Cited

U.S. PATENT DOCUMENTS 430,721 A * 6/1890 Winkler .................. 285/309
2,512,320 A * 6/1950 Fischer .................... 251/95
(Continued)

FOREIGN PATENT DOCUMENTS

CA    2166844 A1    7/1996
CN    1502839 A    6/2004
(Continued)

OTHER PUBLICATIONS

International Search Report and Written Opinion for International Patent Application No. PCT/US2012030002, dated Mar. 21, 2012.
(Continued)

*Primary Examiner* — John K Fristoe, Jr.
*Assistant Examiner* — David Colon Morales
(74) *Attorney, Agent, or Firm* — Neal, Gerber & Eisenberg LLP

(57) ABSTRACT

An embodiment includes a rapid-connect coupler including a coupler body configured to convey a fluid; a coupling head at a first end of and communicating with the coupler body, the coupling head configured to transition between a coupled configuration and a de-coupled configuration. The coupler may further include a stop apparatus configured to allow the coupling head to transition from the de-coupled configuration to the coupled configuration without obstruction, and the stop apparatus may be configured to provide a hard-stop as the coupling head transitions from the coupled configuration to the de-coupled configuration.

21 Claims, 13 Drawing Sheets

(51) Int. Cl.
*F16L 37/42* (2006.01)
*F16L 37/12* (2006.01)

(56) References Cited

U.S. PATENT DOCUMENTS

| | | | | |
|---|---|---|---|---|
| 2,904,351 A | * | 9/1959 | Gellett et al. | 137/599.16 |
| 3,069,127 A | * | 12/1962 | Perry et al. | 251/149.9 |
| 3,583,667 A | * | 6/1971 | Amneus, Jr. | 251/149.5 |
| 3,674,051 A | * | 7/1972 | Stratman | 137/614.04 |
| 3,680,591 A | * | 8/1972 | Vik | 137/614.05 |
| 3,710,823 A | * | 1/1973 | Vik | 137/594 |
| 3,757,836 A | | 9/1973 | Masuda | |
| 3,809,122 A | * | 5/1974 | Berg | 137/614.06 |
| 3,913,844 A | * | 10/1975 | Petrovic | 239/526 |
| 4,181,150 A | * | 1/1980 | Maldavs | 137/614.06 |
| 4,347,870 A | * | 9/1982 | Maldavs | 137/614.05 |
| 4,398,561 A | * | 8/1983 | Maldavs | 137/614.05 |
| 4,541,457 A | * | 9/1985 | Blenkush | 137/614.06 |
| 4,543,995 A | | 10/1985 | Weh et al. | |
| 4,676,269 A | | 6/1987 | Sarson | |
| 4,716,938 A | | 1/1988 | Weh et al. | |
| 5,002,254 A | * | 3/1991 | Belisaire et al. | 251/149.9 |
| 5,046,523 A | * | 9/1991 | Horhota | 137/385 |
| 5,074,332 A | * | 12/1991 | Jones | 137/614.06 |
| 5,080,132 A | * | 1/1992 | Manz et al. | 137/614.04 |
| 5,092,364 A | * | 3/1992 | Mullins | 137/614.05 |
| 5,205,317 A | * | 4/1993 | Neuerberg et al. | 137/242 |
| 5,211,197 A | * | 5/1993 | Marrison et al. | 137/614.04 |
| 5,255,714 A | * | 10/1993 | Mullins | 137/614.04 |
| 5,429,155 A | | 7/1995 | Brzyski et al. | |
| 5,445,358 A | * | 8/1995 | Anderson | 251/149.6 |
| 5,507,530 A | * | 4/1996 | Mahaney | 285/26 |
| 5,630,570 A | | 5/1997 | Lacroix et al. | |
| 5,671,777 A | * | 9/1997 | Allen et al. | 137/614.06 |
| 5,706,967 A | | 1/1998 | Weh et al. | |
| 5,788,443 A | | 8/1998 | Cabahug | |
| 5,806,832 A | | 9/1998 | Larbuisson | |
| 5,884,648 A | * | 3/1999 | Savage | 137/1 |
| 5,896,889 A | * | 4/1999 | Menard | 137/614.04 |
| 5,937,885 A | | 8/1999 | Sampson | |
| 5,950,679 A | | 9/1999 | Danielson et al. | |
| 5,967,491 A | * | 10/1999 | Magnuson et al. | 251/149.6 |
| 5,988,697 A | * | 11/1999 | Arosio | 285/124.1 |
| 6,039,303 A | | 3/2000 | Danielson et al. | |
| 6,073,974 A | | 6/2000 | Meisinger et al. | |
| 6,155,294 A | * | 12/2000 | Cornford et al. | 137/614 |
| 6,202,692 B1 | * | 3/2001 | Schumacher | 137/614.06 |
| 6,279,874 B1 | * | 8/2001 | Nyberg | 251/149.6 |
| 6,412,828 B1 | * | 7/2002 | Lacroix et al. | 285/316 |
| 6,945,477 B2 | | 9/2005 | Lambert et al. | |
| 2003/0085574 A1 | | 5/2003 | Froment et al. | |
| 2004/0094956 A1 | | 5/2004 | Lacroix et al. | |
| 2007/0235092 A1 | * | 10/2007 | Danielson et al. | 137/614 |
| 2008/0185837 A1 | * | 8/2008 | Danielson | 285/86 |
| 2008/0265574 A1 | | 10/2008 | Tiberghien et al. | |
| 2009/0205722 A1 | * | 8/2009 | Sledz | 137/383 |

FOREIGN PATENT DOCUMENTS

| | | |
|---|---|---|
| CN | 101946113 A | 1/2011 |
| EP | 0039977 A1 | 11/1981 |
| WO | 8001711 A1 | 8/1980 |

OTHER PUBLICATIONS

Extended Search Report for European Patent No. 2689177 dated Aug. 5, 2014 (12 pp.).

Office Action for Chinese Patent Application No. 201280024576.0 dated Dec. 31, 2014 (5 pp.).

* cited by examiner

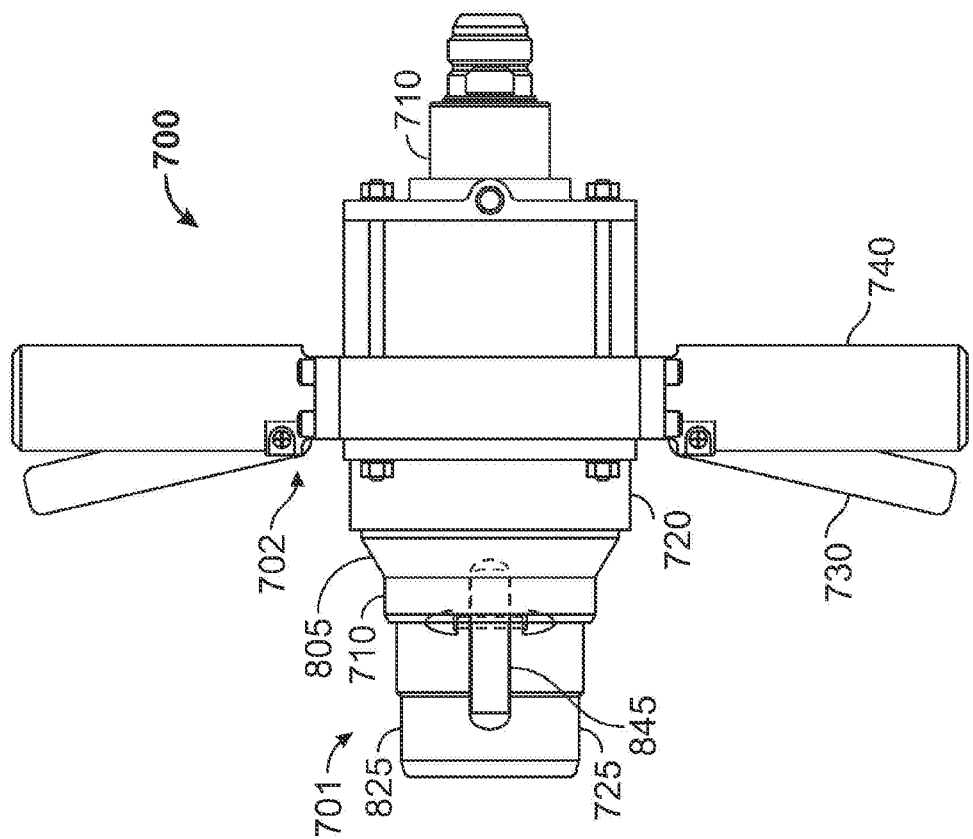
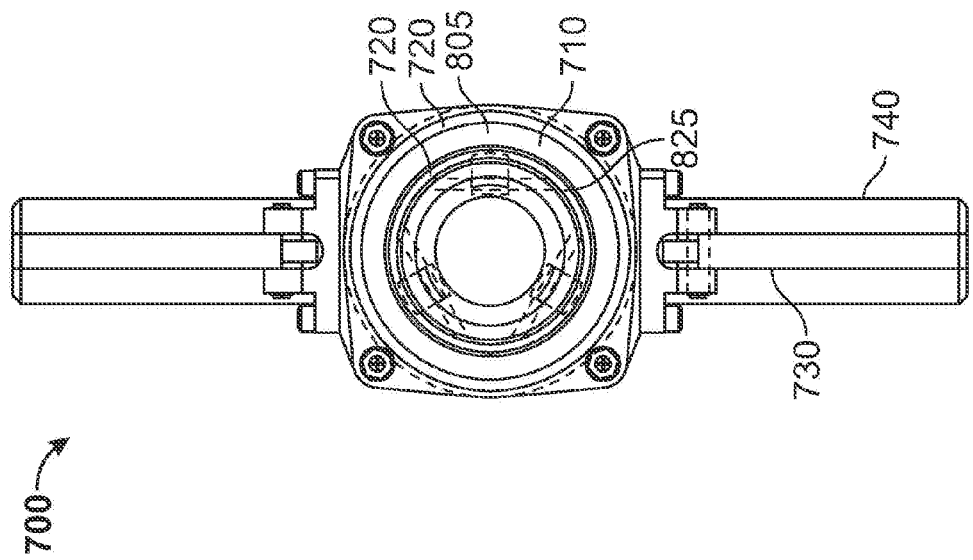
FIG. 7B
FIG. 7A

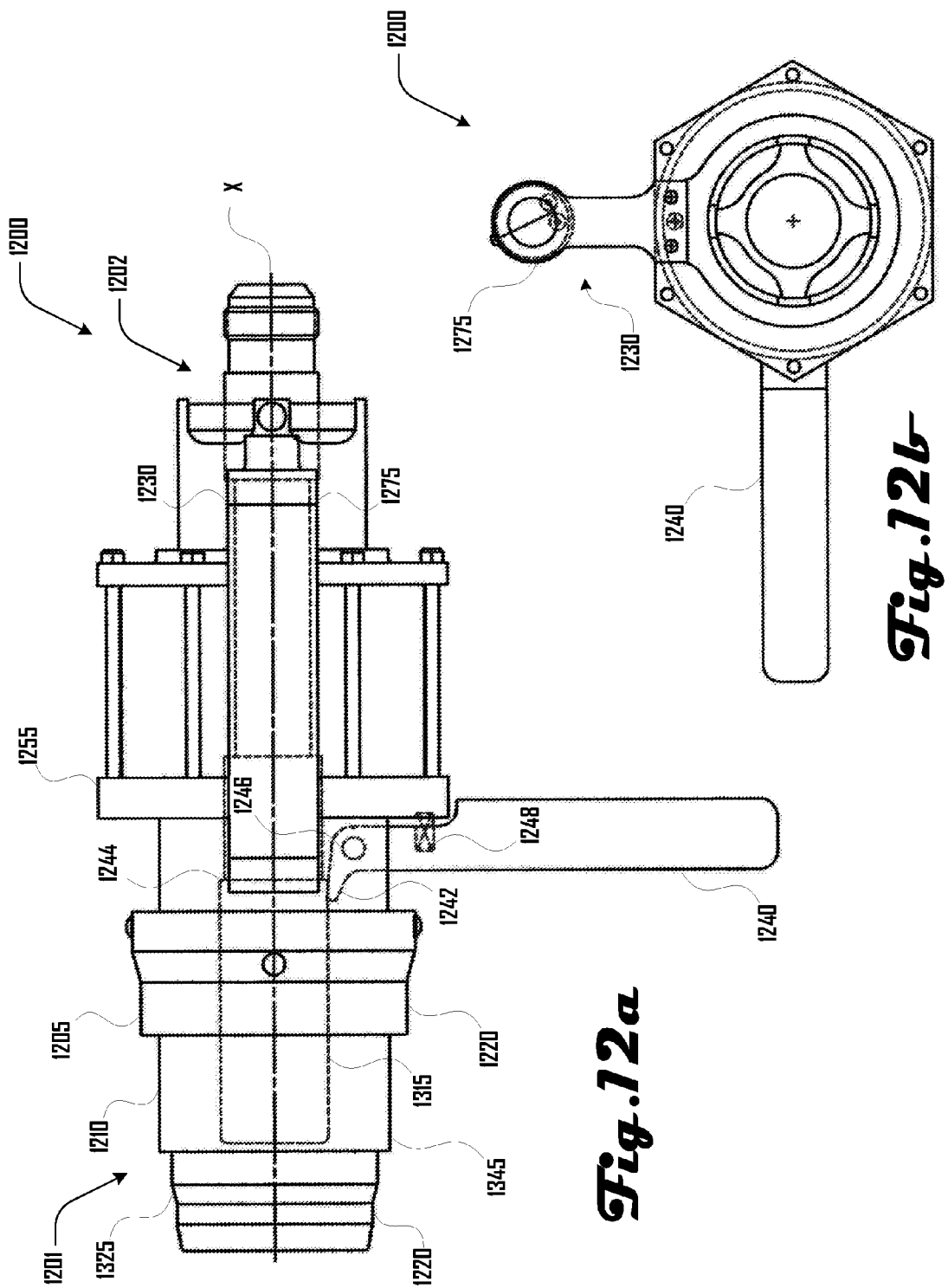

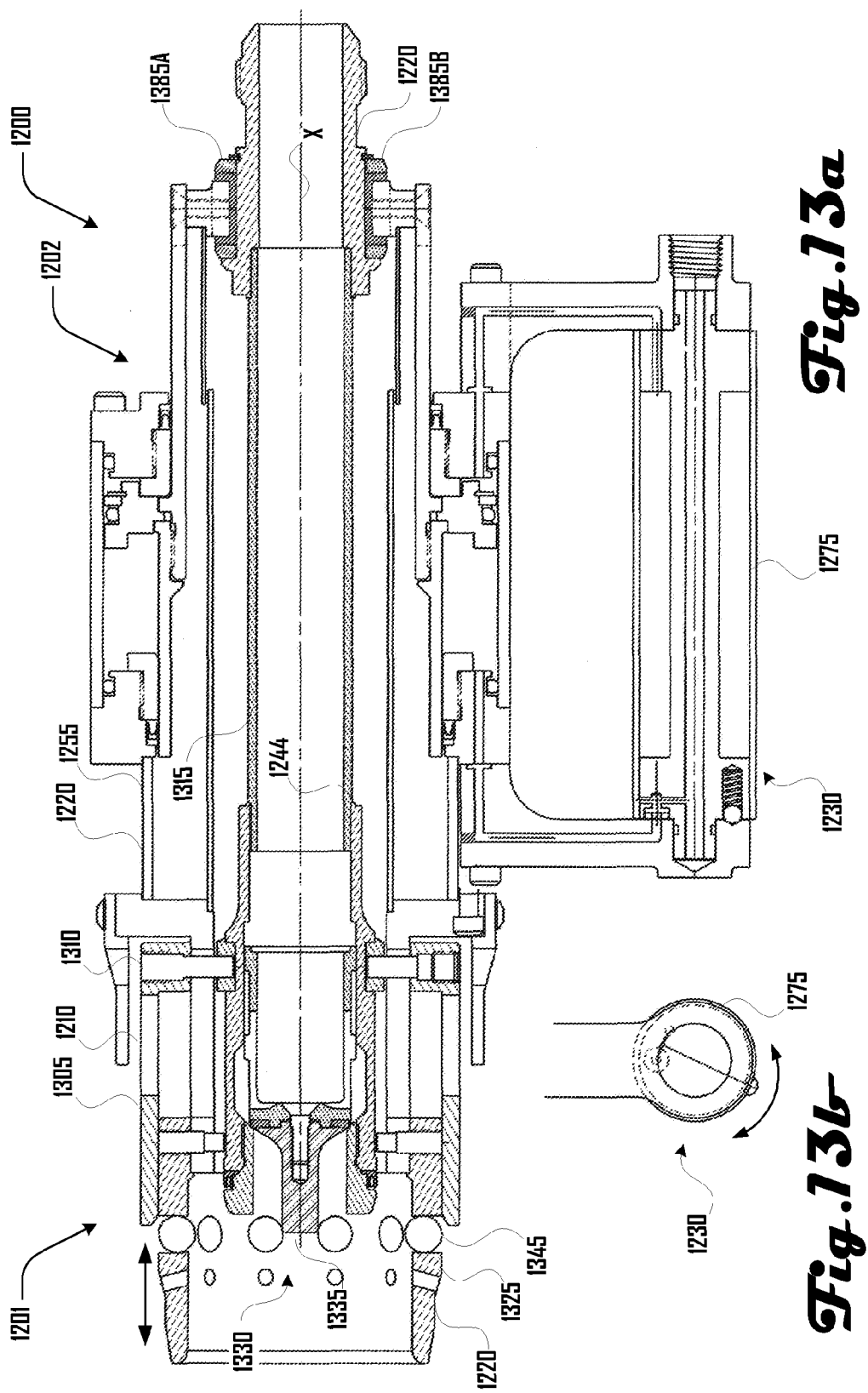

RAPID-CONNECT COUPLER WITH VENT-STOP

PRIORITY CLAIM

This application claims the benefit of U.S. Provisional Application No. 61/454,696 filed on Mar. 21, 2011, which application is incorporated herein by reference in its entirety for all purposes.

BACKGROUND

Cold fluids at cryogenic temperatures (e.g., less than −150° C.) pose special handling problems, principally because the temperature of such fluids may quickly lower the temperature of any valve or coupling through which they flow.

When such a coupling is used to transfer a cryogenic fluid, freeze-up problems may occur if the transfer takes place in a moist or high-humidity environment. Any water within, or immediately outside of, the coupling will quickly freeze, thereby potentially impeding subsequent movement of mechanical parts within the coupling. Moreover, successive transfers from a fluid source with the same pre-chilled coupling half to mating coupling halves communicating with different receptacles at warmer ambient temperatures, have been known to result in freeze-up and leakage because of ice formation at the sealing surfaces.

These problems are present in the area of liquefied natural gas (LNG). In order for LNG to be considered as a viable alternative automotive fuel, it must be easily transferred to the vehicle in which it will be used. In addition, it may be desirable for fuel storage tanks on such vehicles be refilled as quickly as possible. This leads to the prospect of multiple quickly-successive short-duration transfers of LNG, at cryogenic temperatures, between a chilled nozzle and a warm receptacle in a potentially-moist environment.

Additionally, when de-coupling a nozzle and receptacle, there may be gas present between the connection that must be vented as de-coupling occurs. Such remainder gas may be at high pressure, and may cause a forceful de-coupling, which can result in injury to users and equipment.

For example, U.S. Pat. No. 5,429,155 to Brzyski et al, and U.S. Pat. No. 6,945,477 to Lambert et al. fail to adequately address these issues. The design of both products makes them prone to freeze-up during operation and fail to provide positive protection against recoil that may occur during the de-coupling of a nozzle and a receptacle.

SUMMARY

An embodiment of the present disclosure includes a rapid-connect coupler including a coupler body configured to convey a fluid; a coupling head at a first end of and communicating with the coupler body, the coupling head configured to transition between a coupled configuration and a de-coupled configuration. The coupler may further include a stop apparatus configured to allow the coupling head to transition from the de-coupled configuration to the coupled configuration without obstruction, and the stop apparatus may be configured to provide a hard-stop as the coupling head transitions from the coupled configuration to the de-coupled configuration.

The coupling head may be further configured to take a semi-coupled configuration between the coupled configuration and the de-coupled configuration. The stop apparatus may be configured to provide the hard-stop while the coupling head is in the semi-coupled configuration. The coupling head may be configured to couple with a receptacle and communicate fluid with the receptacle when the coupling head is in the coupled configuration and the coupling head may be configured to prevent fluid communication between the receptacle and coupling head when in the de-coupled configuration.

The coupling head may be further configured to take a semi-coupled configuration between the coupled configuration and the de-coupled configuration and may be configured to be coupled to the receptacle and prevent fluid communication between the receptacle and coupling head when in the semi-coupled configuration.

The stop apparatus may be configured to provide the hard-stop while the coupling head is in the semi-coupled configuration. The coupling head may be configured to vent fluid between the coupled and semi-coupled configuration, the venting fluid released when a portion of the coupling head decouples from the receptacle.

The stop apparatus may include a stop-release configured to release the hard stop and allow the coupling head to transition to the de-coupled configuration. The rapid-connect coupler may include a probe assembly operable to translate within a housing barrel, and the stop apparatus may include a stop pin configured to selectively arrest translation of the probe assembly within the housing barrel and thereby generate the hard-stop.

In one embodiment a rapid-connect coupler may include a first architecture with an elongated probe assembly and a sleeve coupled to the probe assembly at a first-probe end and having a greater diameter than the probe assembly; and a second architecture with an elongated housing barrel surrounding the probe assembly, the probe slidably residing within the housing barrel, and a cage coupled to the housing barrel at a housing-barrel-first end defining a portion of a coupling orifice and slidably residing within the sleeve.

The first architecture may include one or more drive pins coupling the sleeve to the probe assembly, the drive pins extending through the housing barrel. The probe assembly, sleeve, housing barrel, and cage may share a central axis, and the first and second architecture may be configured to slidably translate parallel to the central axis relative to each other.

The sleeve may have a greater diameter than the cage, the cage may have a greater diameter than the housing barrel, and the housing barrel may have a diameter greater than the probe assembly.

The cage may include a plurality of balls configured to extend into the coupling orifice. The plurality of balls may be disposed within tapered holes. The sleeve may be configured to slide over the cage and lock the plurality of balls in a coupled configuration.

The rapid-connect coupler may include a handle assembly coupled to the first and second architecture and configured to slidably configure the first and second architecture relative to each other. The rapid-connect coupler may be configured to take a de-coupled configuration and a coupled configuration, and may further include a stop apparatus configured to allow the rapid-connect coupler to transition from the de-coupled configuration to the coupled configuration without obstruction, and configured to provide a hard-stop as the rapid-connect coupler transitions from the coupled configuration to the de-coupled configuration.

The rapid-connect coupler may be further configured to take a semi-coupled configuration between the coupled configuration and the de-coupled configuration. The stop apparatus may be configured to provide the hard-stop while the rapid-connect coupler is in the semi-coupled configuration.

One embodiment includes a method of coupling and de-coupling a rapid-connect coupler and providing a positive stop in the rapid-connect coupler, the method including: providing a rapid-connect coupler in a de-coupled configuration, the rapid-connect coupler having: a coupling head configured transition between a coupled configuration and a de-coupled configuration and a stop apparatus configured to allow the rapid-connect coupler to transition from the de-coupled configuration to the coupled configuration without obstruction, and configured to provide a hard-stop as the rapid-connect coupler transitions from the coupled configuration to the de-coupled configuration. The method may further include transitioning the rapid-connect coupler into the coupled configuration from the de-coupled position; and transitioning the rapid-connect coupler toward the de-coupled configuration from the coupled position until the stop-apparatus generates a hard-stop at a hard-stop position between the coupled configuration to the de-coupled configuration.

The method may also include actuating the stop apparatus to release the hard-stop and transitioning the rapid-connect coupler from the hard-stop position to the decoupled position.

The method may include positioning the coupling head over a receptacle while the rapid-connect coupler is substantially in the de-coupled position where transitioning the rapid-connect coupler into the coupled configuration from the de-coupled position couples the coupling head with the receptacle. The rapid-connect coupler may be inoperable to communicate fluid out of the coupling head when in the de-coupled position, and the rapid-connect coupler may operable to communicate fluid out of the coupling head when in the coupled position.

The rapid-connect coupler may remain coupled with the receptacle in the hard stop position. The method may also include terminating a fluid flow between the receptacle and the rapid-connect coupler as the rapid-connect coupler transitions from the coupled position to the hard-stop position.

Terminating the fluid flow between the receptacle and the rapid-connect coupler may generate a substantial force therebetween and the rapid-connect coupler may remain coupled with the receptacle in the hard-stop position which counters the force.

Terminating the fluid flow between the receptacle and the rapid-connect coupler may generate a discharge of fluid, and the method may also include waiting for the discharge of fluid to cease before actuating the stop apparatus to release the hard-stop. Actuating the stop apparatus to release the hard-stop may include actuating a hard-stop release lever. A timer may actuate the stop apparatus to release the hard-stop.

BRIEF DESCRIPTION OF THE DRAWINGS

The present subject matter disclosure will be described by way of exemplary embodiments but not limitations, illustrated in the accompanying drawings in which like references denote similar elements, and in which:

FIG. 7a is a front view of a rapid-connect coupler in accordance with an embodiment.

FIG. 7b is a side view of a rapid-connect coupler in accordance with an embodiment.

FIG. 12a is a side view of a rapid-connect coupler in accordance with an embodiment.

FIG. 12b is a rear view of a rapid-connect coupler in accordance with an embodiment.

FIG. 13a is a cross section of a rapid-connect coupler in accordance with an embodiment.

FIG. 13b is a side view of a handle assembly in accordance with an embodiment.

DETAILED DESCRIPTION

Illustrative embodiments presented herein include, but are not limited to, systems and methods for providing a rapid-connect gas coupler.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Figure 1:
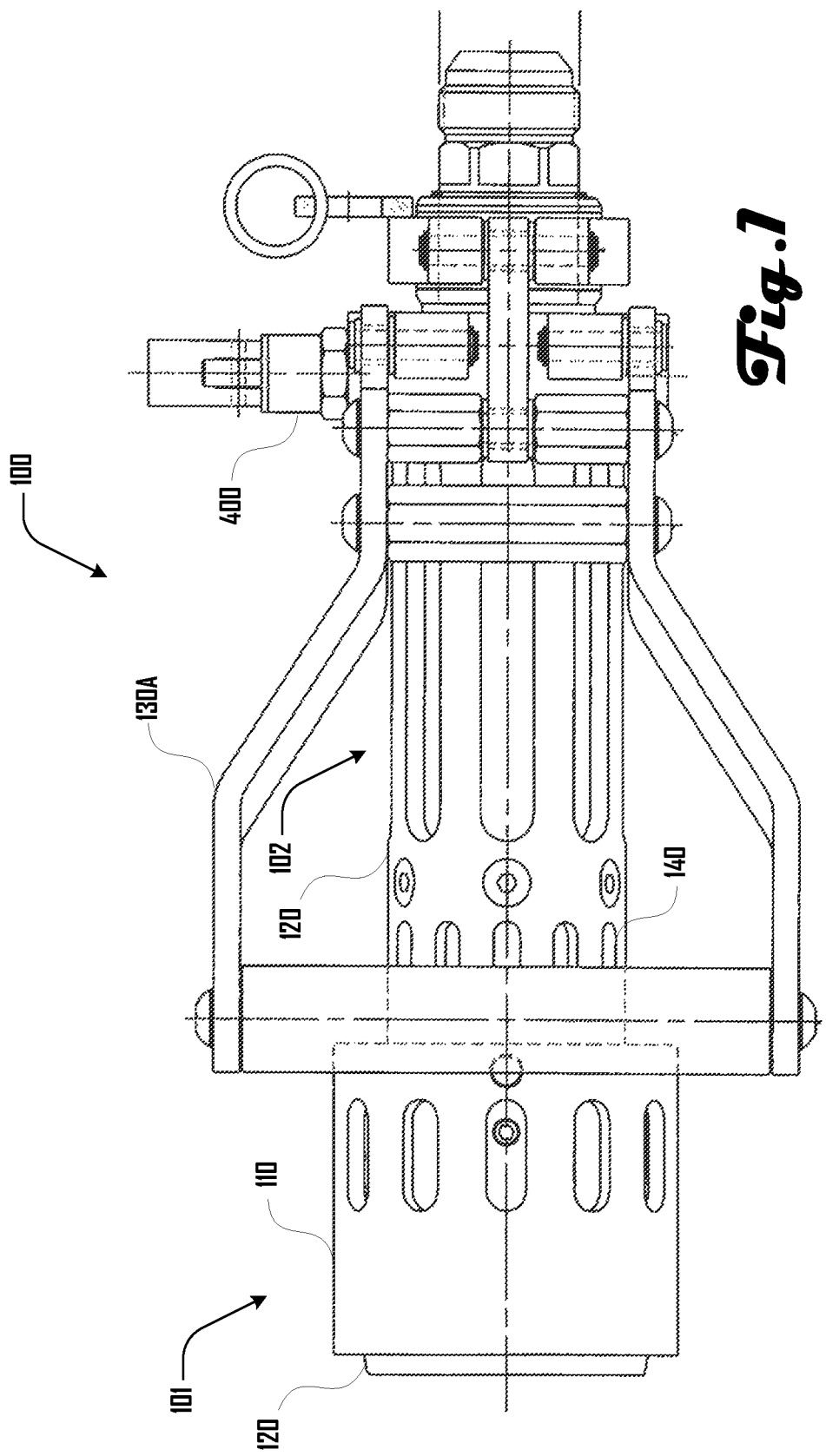
FIG. 1 is a perspective view of a rapid-connect coupler in accordance with an embodiment.

FIG. 1 is a perspective view of a rapid-connect coupler 100 in accordance with an embodiment, which generally comprises a first architecture 110 and a second architecture 120, which are operable to move relative to each other as further described herein. Portions of the first and second architecture 110, 120 define a coupling head 101 and a coupler body 102. The rapid-connect coupler 100 further comprises a vent-stop 400, a first handle 130A, one or more drive slots 140 and a second handle 130B (FIG. 2), which are further described herein.

Figure 2:
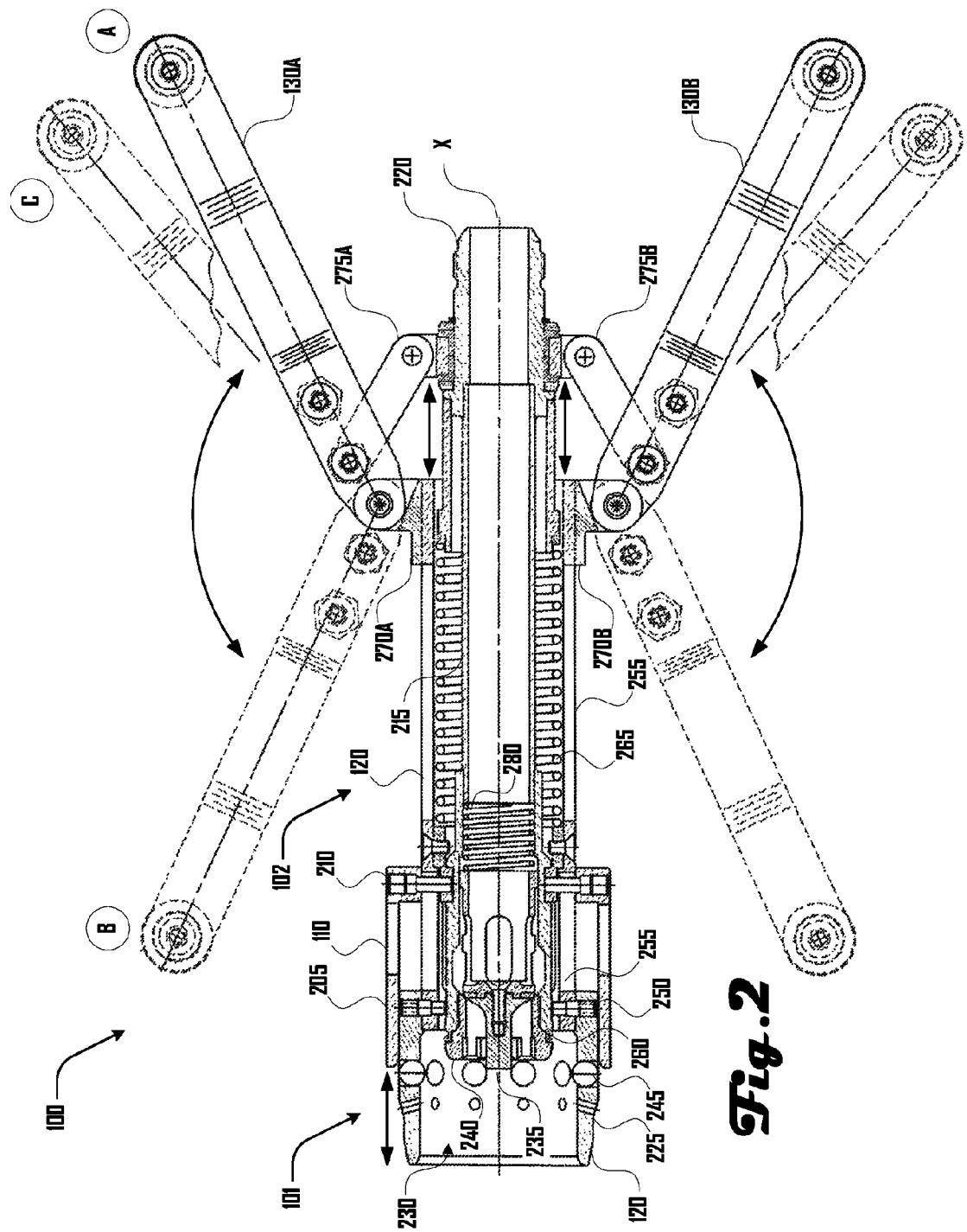
FIG. 2 is a cross section of the rapid-connect coupler in a first configuration in accordance with the embodiment of FIG. 1.
Figure 3:
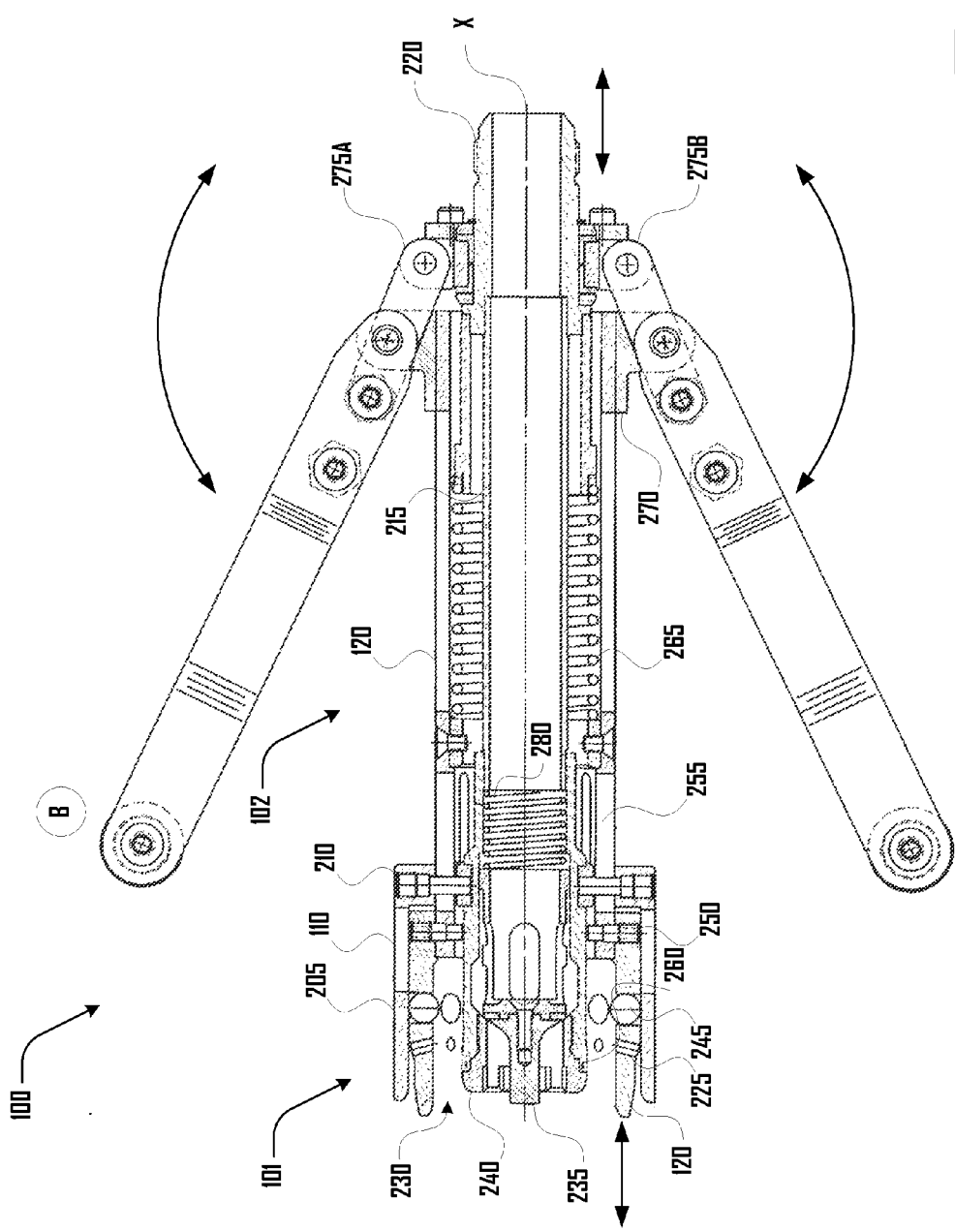
FIG. 3 is a cross section of the rapid-connect coupler in a second configuration in accordance with the embodiment of FIG. 1.

FIGS. 2 and 3 are a cross section of the rapid-connect coupler 100 in a first and second configuration respectively, in accordance with the embodiment of FIG. 1 which generally comprises a first architecture 110 and a second architecture 120, which are operable to move relative to each other along a central axis X. The first architecture 110 comprises a sleeve 205, one or more drive pin 210, and a probe assembly 215, which includes a coupling end 220. The one or more drive pin 210 extends though a respective drive slot 140 defined by a portion of the second architecture 120.

The second architecture 120 comprises a ball cage 225, which defines a coupling orifice 230 and includes one or more ball 245. Within the coupling orifice 230 resides a female poppet assembly 235, which is biased by a poppet assembly spring 280, and the female poppet assembly 235 further comprises a retainer 240, and seal assembly 260. The second architecture 120 further comprises one or more guide pins 250, and a housing barrel 255. In an embodiment, the one or more guide pins 250 may be operable to provide a positive guide the second architecture 120 about the female poppet assembly 235. Additionally, in an embodiment, the second architecture 120 or portions thereof may be removable, and may be configured for easy and swift removal and replacement, which may be required due to damage or maintenance needs.

The first and second handle 130A, 130B are rotatably coupled to the housing barrel 255, via a first and second barrel flange 270A, 270B respectively. Additionally, a first and second link assembly 275A, 275B are rotatably attached to the first and second handle 130A, 130B respectively. A first and second link assembly 275A, 275B are rotatably attached to the probe assembly 215.

The first and second handle 130A, 130B are operable to rotate about the first and second barrel flange 270A, 270B respectively over a range of motion including configurations A, B, and C, which are depicted in FIG. 2. FIG. 3 depicts the rapid-connect coupler 100 in configuration B. In some embodiments, these configurations may be a de-coupled configuration A, a coupled configuration B, and a semi-coupled configuration C.

As the first and second handle 130A, 130B rotate between the A and B configurations, for example, the first architecture 110 and a second architecture 120 move relative to each other along the central axis X. The probe assembly 215 translates within the housing barrel 255, and is biased by a probe spring 265. Additionally, the ball cage 225 is operable to translate within the sleeve 205. For example, FIG. 2 depicts the ball cage 225 extending substantially past the sleeve 205, whereas FIG. 3 depicts the ball cage 225 extending only partially past the sleeve 205.

Additionally, FIG. 2 depicts the ball cage 225 extending substantially past the female poppet assembly 235, whereas FIG. 3 depicts the ball cage 225 extending only partially past the female poppet assembly 235. Accordingly, the volume of the coupling orifice 230 is depicted as being greater in FIG. 2 compared to FIG. 3. The ball cage 225 and sleeve 205 may define a portion of the coupling head 101.

As depicted in, for example, FIGS. 1-3 and 5, the sleeve 205 may have a greater diameter than the probe assembly 215 and be coupled thereto via one or more driving pins 210, which extend through slots 140 (FIG. 1) in the housing barrel 120. The probe assembly 215 may be slidably disposed within the housing barrel 120, and therefore the probe assembly 215 may have a smaller diameter than the housing barrel 120 and may have a smaller diameter than the sleeve 205. The ball cage 225 may have a greater diameter than the housing barrel 255 and be coupled thereto via guide pins 250.

Such a configuration may be desirable because user exposure to moving parts and pinch-points may be reduced in addition to allowing for a reduced profile of the coupler 100. For example, the housing barrel 255 may cover moving parts associated with the probe assembly.

Figure 5:
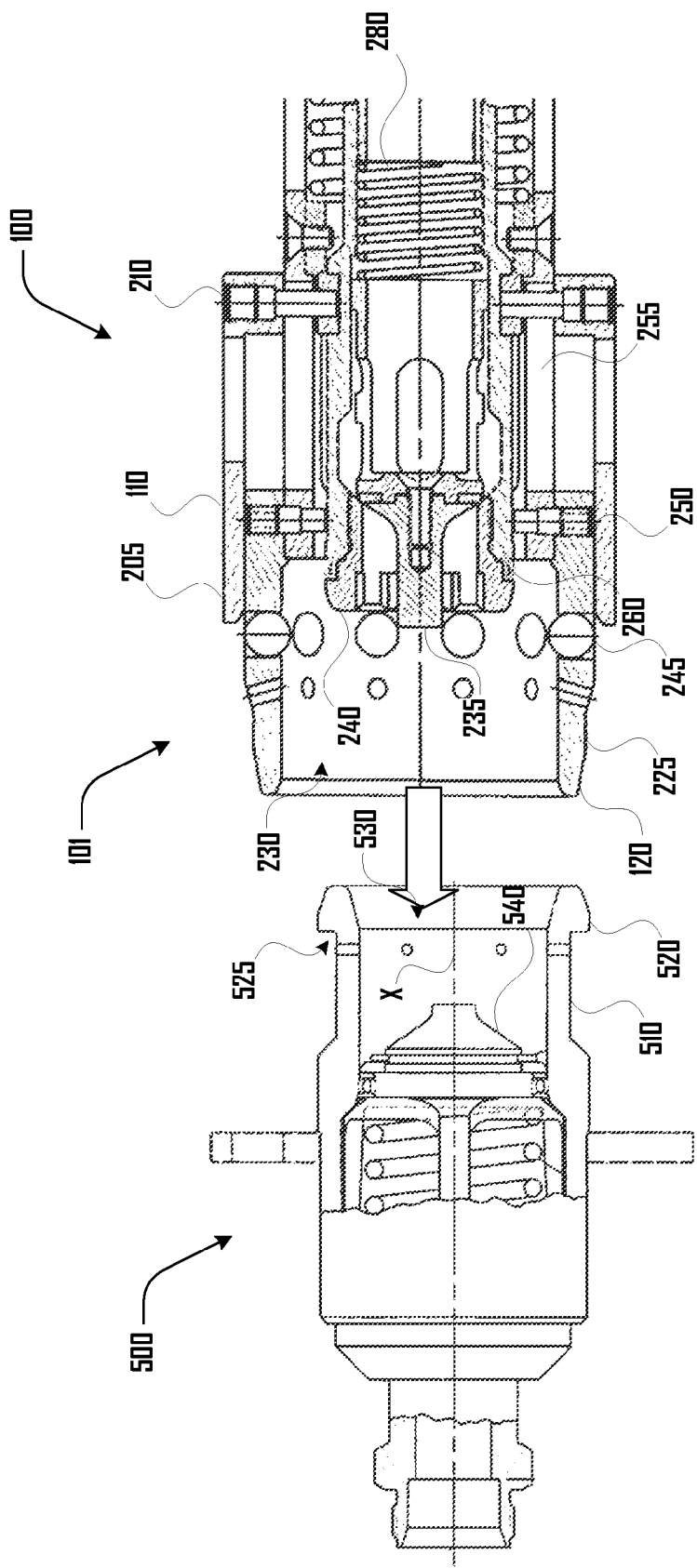
FIG. 5 is a cross section of a rapid-connect coupler and a male fueling receptacle in accordance with an embodiment.

As discussed further herein, and referring to FIG. 5, the rapid-connect coupler 100 is operable to couple with a male fueling receptacle 500. For example, the rapid-connect coupler 100 is placed on the male fueling receptacle 500 while in configuration A, and then transitioned into configuration B, to lock the rapid-connect coupler 100 on the male fueling receptacle 500, and then returned to configuration A to release the rapid-connect coupler 100 from the male fueling receptacle 500. As the rapid-connect coupler 100 is released from the male fueling receptacle 500, gas (e.g. liquid natural gas), may vent from the rapid-connect coupler 100 as the connection with the male fueling receptacle 500 is broken. For example, venting may occur as the poppets 540, 235 disengage.

In some embodiments, it may be desirable to allow the rapid-connect coupler 100 to vent before the rapid-connect coupler 100 is fully disengaged from the male fueling receptacle 500 because venting may generate a substantial force that could propel the rapid-connect coupler 100 toward a user or the like. Therefore, in an embodiment, the rapid-connect coupler 100 may be operable to generate a positive stop, which allows the rapid-connect coupler 100 to vent before it is fully disengaged from the male fueling receptacle 500. Venting before fully disengaging may be desirable because force generated by venting fluid could cause the coupler 100 to recoil and harm an operator if the coupler 100 did not remain coupled to the receptacle 500 to absorb the force and prevent recoil of the coupler 100.

Additionally, should the poppets 540, 235 fail to properly disengage and prevent respective fluid flow from the coupler 100 and receptacle 500, having the coupler 100 remain coupled to the receptacle 500 provides an operator the opportunity to re-engage the poppets 540, 235 by moving the coupler 100 into the coupled configuration B, stop undesired fluid release, and address issues with the poppets 540, 235 without continued release of fluid from one or both of the coupler 100 and receptacle 500.

Again referring to FIG. 2, as the handles 130A, 130B are pulled back from configuration B toward configuration A, the rapid-connect coupler 100 may be operable to generate a positive stop of the handles 130A, 130B at configuration C, which may allow the rapid-connect coupler 100 to vent while in configuration C before returning to configuration A, where the rapid-connect coupler 100 may be released from the male fueling receptacle 500. Accordingly, in an embodiment, the rapid-connect coupler 100 may remain substantially coupled to the male fueling receptacle 500 while in configuration C, but allow the rapid-connect coupler 100 to vent.

Figure 4:
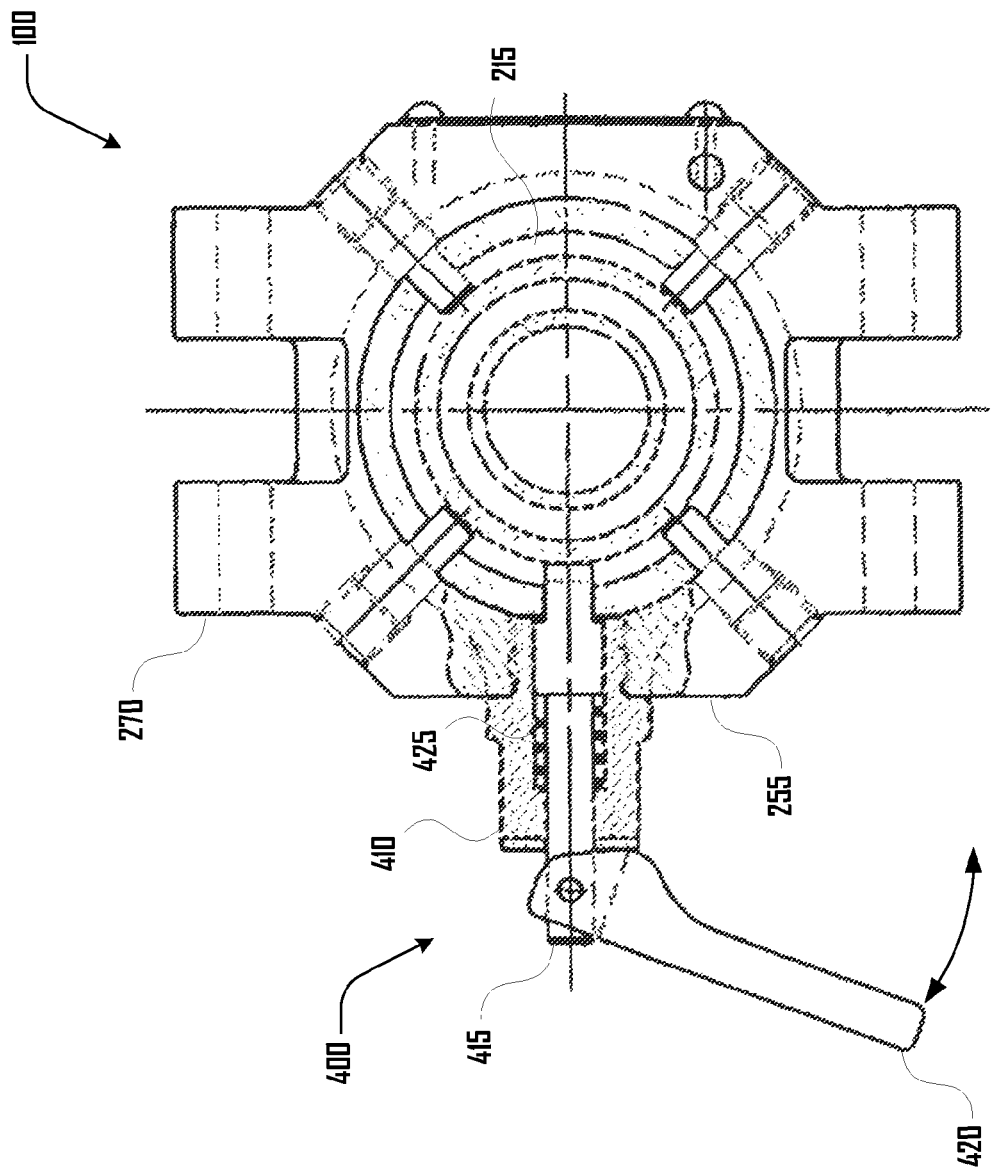
FIG. 4 is a cross section of a vent-stop in accordance with the embodiment of FIG. 1.

In one embodiment, the rapid-connect coupler 100 may be operable to generate a positive stop via a vent-stop 400 (FIGS. 1 and 4). Referring to FIG. 4, in an embodiment, the vent-stop 400 may comprise a stop housing 410, in which holds a stop pin 415. The stop pin 415 may be operable to generate a positive stop at configuration C, and the rapid-connect coupler 100 may then be allowed to take configuration A by depressing stop lever 420, which is biased by a stop spring 425. For example, in an embodiment, the vent-stop 400 may be operable to arrest translation of the probe assembly 215 within the housing barrel 255 at configuration C.

FIG. 4 also depicts a plurality of guide pins that extend through the housing barrel 255 that are configured to guide and stabilize the probe assembly 215 within the housing barrel 255. In an embodiment, guide pins may be desirable because they may provide for simple maintenance and alignment of the probe assembly 215.

In some embodiments, the rapid-connect coupler 100 may be operable to move from configuration A to configuration B, without a positive stop at configuration C, but be operable to have a positive stop at configuration C when moving from configuration B to configuration A. However, in some embodiments, a positive stop may occur when moving from configuration B to configuration A and vice versa.

FIG. 5 is a cross section of a rapid-connect coupler 100 and a male fueling receptacle 500 in accordance with an embodiment, which are aligned at a central axis X. The male fueling receptacle 500 comprises a male coupling body 510, which includes a lip 520, and a recess 525 behind the lip 520. The male coupling body 510 defines a male poppet orifice 530. A male poppet assembly 540 is disposed within the poppet orifice 530.

As discussed herein, the rapid-connect coupler 100 may be operable to couple with the male fueling receptacle 500. For example, the rapid-connect coupler 100 may be placed on the male fueling receptacle 500 while in configuration A, put into configuration B to lock the rapid-connect coupler 100 on the male fueling receptacle 500, and then returned to configuration A to release the rapid-connect coupler 100 from the male fueling receptacle 500.

For example, referring to FIG. 5, the male coupling body 510 is operable to be slidably received within the female coupling orifice 230, and the female poppet assembly 235 is operable to be slidably received within the male poppet orifice 530 such that the female poppet assembly 235 bears against the male poppet assembly 540.

As the male coupling body 510 is received within the female coupling orifice 230, and when the rapid-connect coupler 100 is in configuration A, as depicted in FIGS. 2 and 5, the lip 520 is operable to push the one or more balls 245 outward, and thereby allow the lip 520 to pass past the balls 245. The balls 245 may then be able to fall into or be forced into the recess 525 behind the lip 520.

For example, the rapid-connect coupler 100 may then move to configuration B as shown in FIG. 3, which causes the sleeve 205 to slide over the balls 245, which pushes the balls 245 into the recess 525 behind the lip 520 and then locks the balls 245 in a position wherein the balls 245 extend into the female coupling orifice 230 in the recess 525 of the male coupling body 510. Accordingly, the male coupling body 510 may locked within the female coupling orifice 230.

Additionally, in such a configuration the male and female poppet 540, 235 may be operable to allow fluid (e.g., liquid natural gas) to pass from the rapid-connect coupler 100 into male coupling body 510. Also, the sealing assembly 260 may be operable to provide a seal by bearing against the interior surface of the male coupling body 510 within the male poppet orifice 530. In an embodiment the sealing assembly 260 may be a two piece seal with an energizing spring.

The coupled rapid-connect coupler 100 and male coupling body 510 may be allowed to vent by moving the rapid-connect coupler 100 to configuration C (FIG. 2), which may retract the sleeve 205 such that the balls 245 are able to partially retract and allow the male and female poppet 540, 235 to disengage, and allow remaining gas from the connection to escape, while still locking the male coupling body 510 within the female coupling orifice 230 via the balls 245 partially residing within the recess 525.

A user may actuate the vent stop 400 to allow the sleeve 205 to fully retract, and thereby allow the balls 245 to movably reside within the sleeve 205 such that the lip 520 of the male coupling body 510 is allowed to pass past the balls 245, and thereby allows the male coupling body 510 to leave the female coupling orifice 230.

In various embodiments, balls 245 within the sleeve 205 may be desirable. For example, the balls 245 allow the male coupling body 510 to be guided and rolled into the female coupling orifice 230; the spherical shape of the balls 245 prevents catching of the male coupling body 510 as it passed the balls 245; and the balls 245 tend to release ice more efficiently, which forms when cold temperatures are present (e.g., when using a cooled gas such as liquid natural gas or in cold environmental conditions).

Figure 6:
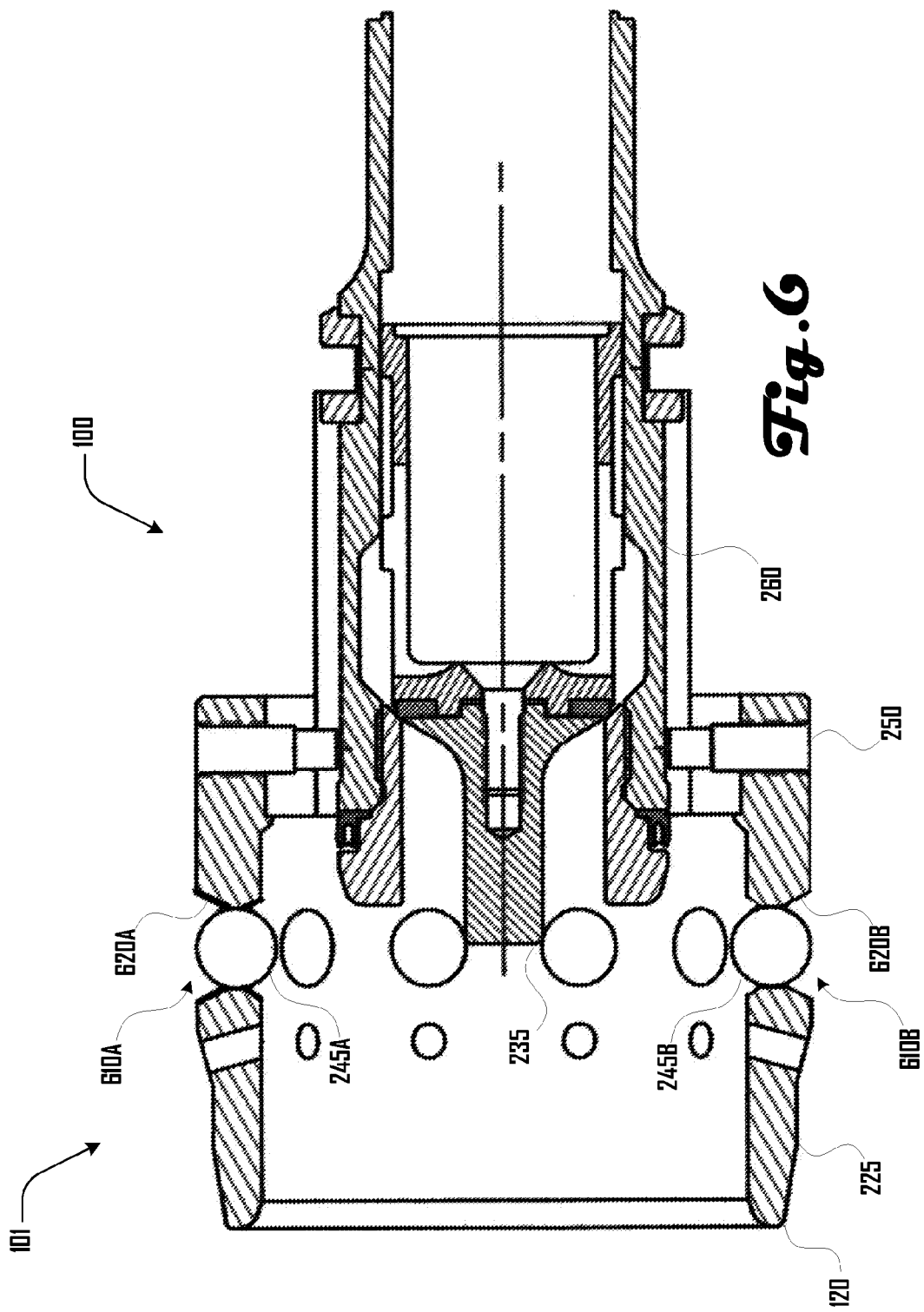
FIG. 6 is a cross section of a rapid-connect coupler coupling head with tapered ball slots.

Additionally, in some embodiments as depicted in FIG. 6, it may be desirable for the balls 245 to be disposed within a tapered slot 610A, 610B, which is defined by a tapered wall 620A, 620B. For example, tapered slots 610A, 610B may be concave toward the external and internal portions of the ball cage 225. Tapered slots 610A, 610B may be desirable because the tapered slots 610A, 610B tend to release ice more efficiently, which may form within the tapered slots 610A, 610B when cold temperatures are present (e.g., when using a cooled gas such as liquid natural gas or in cold environmental conditions). The tapered walls 620A, 620B may be various configurations and types of tapers, including linear tapers or curved tapers, and the entirety of the tapered slots 610A, 610B may or may not include a taper.

Figure 8:
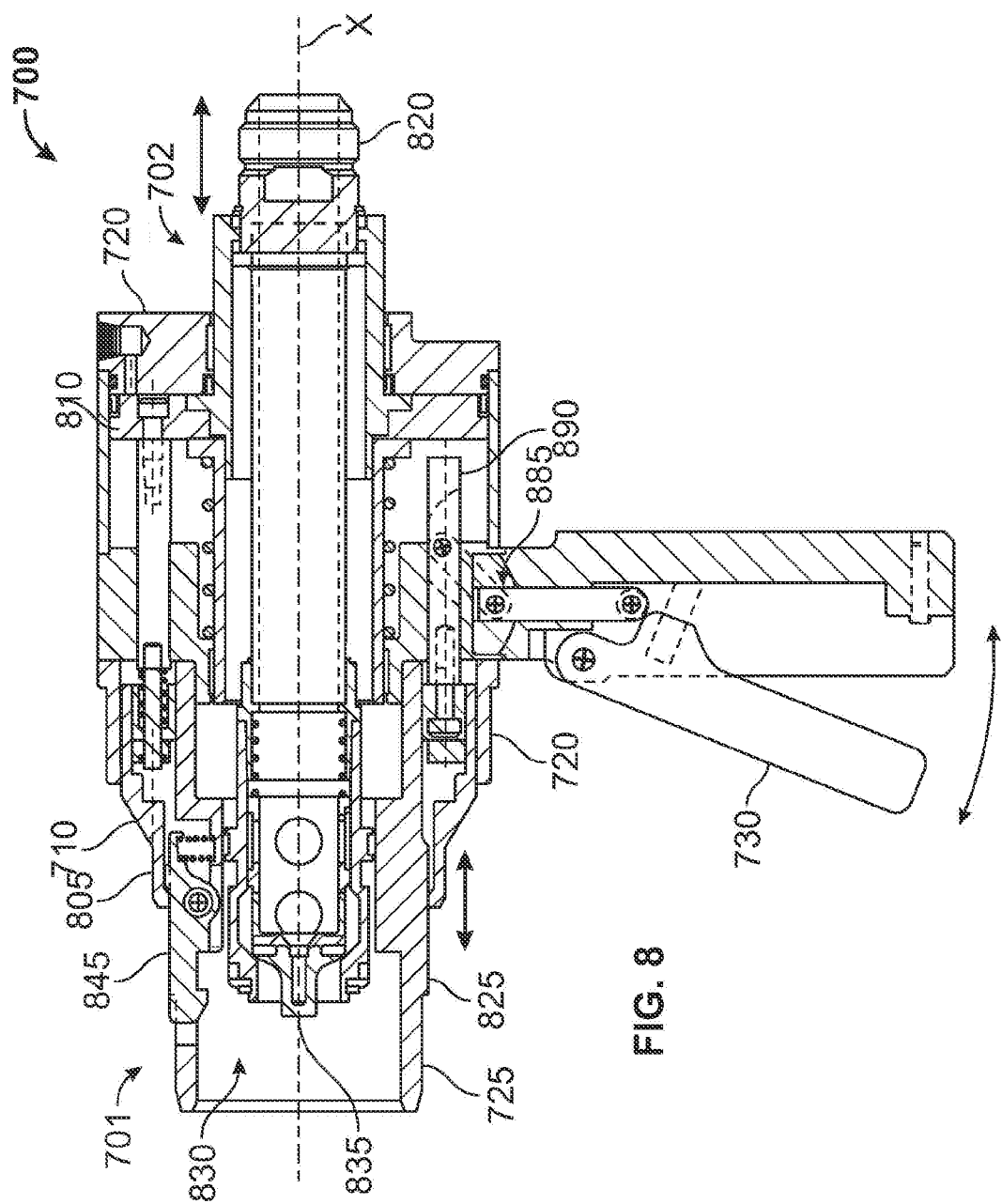
FIG. 8 is a cross section of a rapid-connect coupler in accordance with an embodiment.
Figure 9:
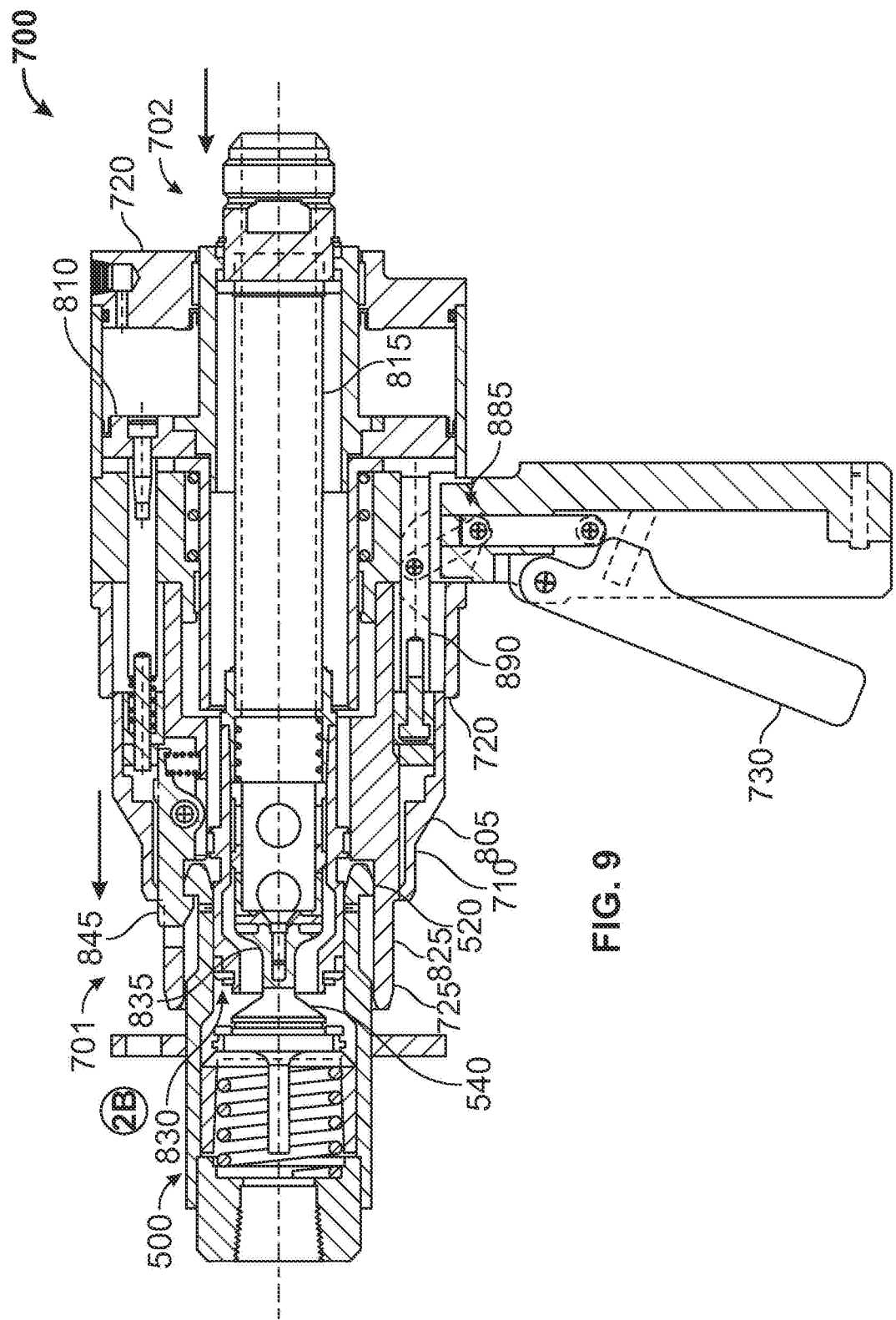
FIG. 9 is a cross section of a rapid-connect coupler in a first configuration and a male fueling receptacle in accordance with the embodiment of FIG. 8.
Figure 10:
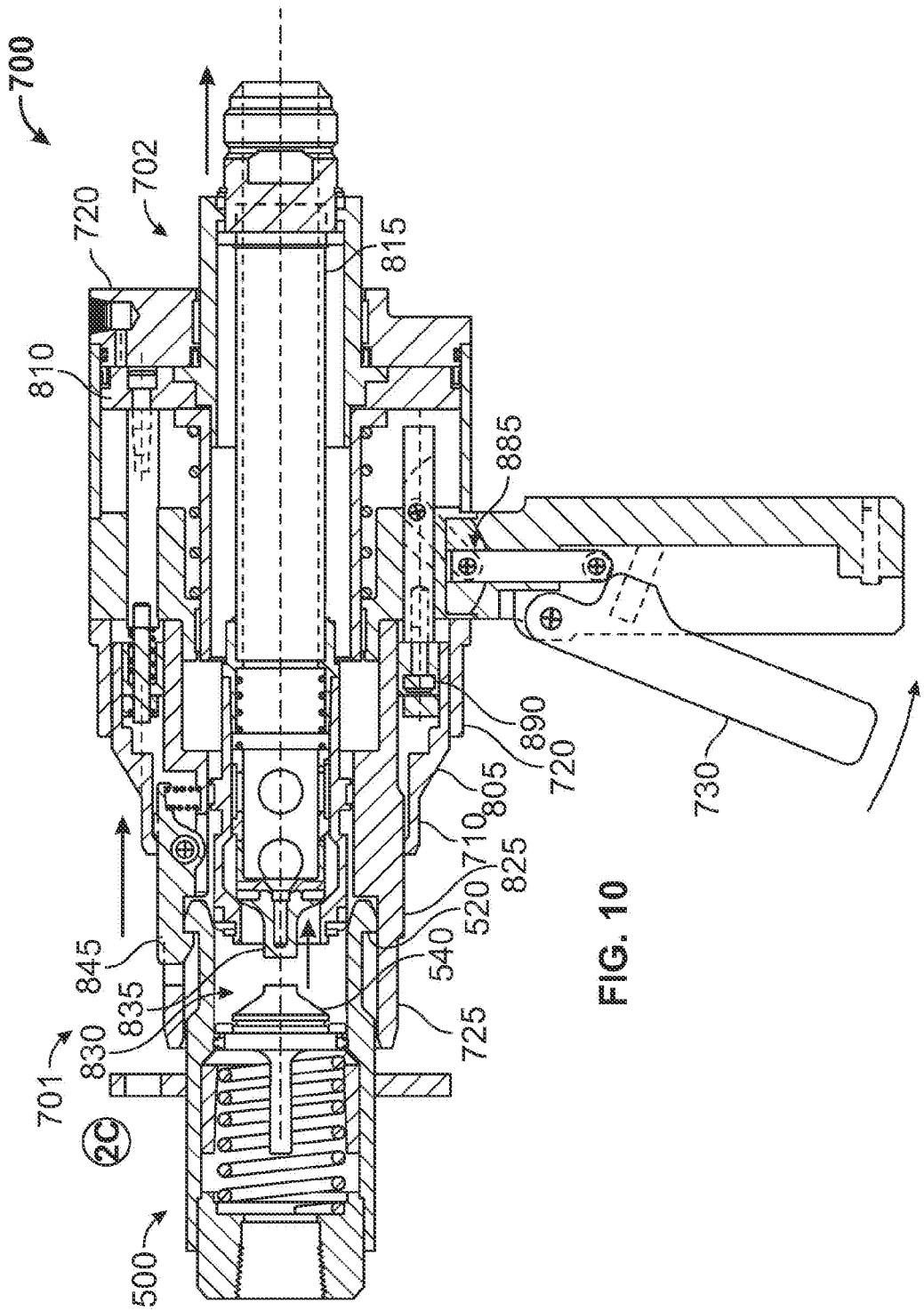
FIG. 10 is a cross section of a rapid-connect coupler in a first configuration and a male fueling receptacle in accordance with the embodiment of FIG. 8.
Figure 11:
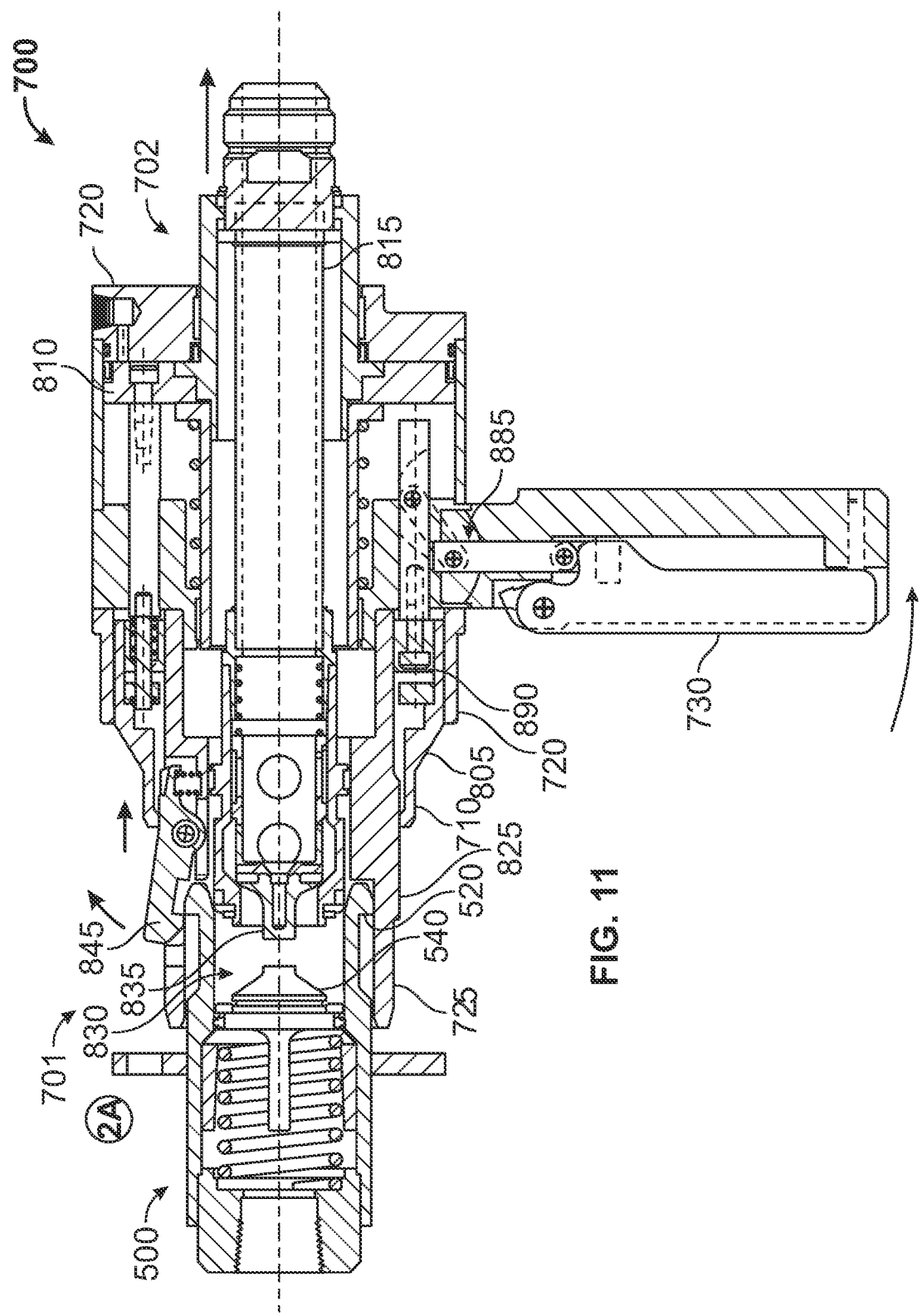
FIG. 11 is a cross section of a rapid-connect coupler in a first configuration and a male fueling receptacle in accordance with the embodiment of FIG. 8.

FIGS. 7a and 7b are a front and side view of a rapid-connect coupler 700 in accordance with another embodiment. FIG. 8 is a cross section of the rapid-connect coupler 700. FIGS. 9-11 depict the rapid-connect coupler 700 coupling with a receptacle 500 in a first, second and third configuration respectively.

The rapid-connect coupler 700 generally comprises a first architecture 710 and a second architecture 720, which are operable to move relative to each other along a central axis X. The first architecture 710 comprises a sleeve 805, one or more drive assembly 810, and a probe assembly 815, which includes a coupling end 820. Portions of the first and second architecture 710, 720 define a coupling head 701 and a coupler body 702.

The second architecture 720 comprises a cage 725, which defines a coupling orifice 830. A female poppet assembly 835 resides within the coupling orifice 830. In an embodiment, the second architecture 120 or portions thereof may be removable, and may be configured for easy and swift removal and replacement, which may be required due to damage or maintenance needs. The ball cage 725 and sleeve 825 may define a portion of the coupling head 701.

One or more handle 740 may be coupled to the second architecture 720, which is configured to move the sleeve 825 and poppet assembly 815 via a trigger 730, link assembly 885, and link bar 890. The coupler 700 is configured to move over a range of motion including configurations, 2B, 2C and 2A which are depicted in FIGS. 9, 10 and 11 respectively. In some embodiments, these configurations may be a de-coupled configuration 2A, a coupled configuration 2B, and a semi-coupled configuration 2C.

For example, FIG. 9 depicts the coupler 700 coupled to a receptacle 500 wherein complementary poppets 540, 835 engage to allow fluid to flow or communicate between the receptacle 500 and the coupler 700. The coupler 700 couples with the receptacle 500 by a biased latch 845 hooking with a complementary lip 520 on the receptacle 500. The latch 845 is held in place by the sleeve 805, which moves forward from a decoupled position 2A to the coupled position 2B.

FIG. 10 depicts the coupler in a semi-coupled position 2C, wherein the sleeve 805 partially retracts along with the poppet 835 and probe assembly 815. The sleeve 805 holds the latch 845 down such that the latch 545 remains hooked with the lip 520 and the coupler 700 remains coupled with the receptacle 500. However, the disengaged poppets 540, 835 prevent fluid from flowing or communicating between or from the coupler 700 and receptacle 500.

As the poppets 540, 835 disengage as the coupler 700 moves from coupled configuration 2B to semi-coupled configuration 2C, fluid may be released. The venting fluid may generate a repulsive force between the coupler 700 and the receptacle 500, which may be opposed by the connection between the coupler 700 and the receptacle 500. This may be desirable in various embodiments because the coupler 700 is allowed to safely vent before decoupling from the receptacle 500, which may prevent injury to an operator as the coupler 700 recoils when the poppets 540, 835 disengage.

The coupler 700 may the move from semi-coupled configuration 2C to decoupled configuration 2A as depicted in FIG. 11. The sleeve 805 further retracts, which causes the latch 845 to rotate upward and away from the receptacle 500. The latch 845 thereby disengages from the lip 520, which allows the coupler 700 to disengage and decouple from the receptacle 500. The coupler 700 may then be coupled to the receptacle 500 by positioning the coupling orifice 830 over the receptacle 500.

The coupler 700 may be configured by the trigger 730 and transitioned between the de-coupled, coupled and semi-coupled configurations 2A, 2B, 2C. For example, the trigger 730 may be depressed so that the coupler 700 takes the decoupled position 2A as depicted in FIG. 11. The coupler 700 may then be positioned on the receptacle 500 and the trigger 730 may be released so that the sleeve 805 slides over the latch 845, which rotates the latch 845 down to engage the lip 520, which couples the coupler 700 and the receptacle 500. The coupler 700 is then in the coupled position 2B. Positioning the coupler 700 over the receptacle 500 causes the poppets 540, 835 to engage and allow fluid to flow between the coupler 700 and the receptacle 500.

The trigger 730 may then be partially depressed so that the coupler 700 transitions to the semi-coupled configuration 2C. In various embodiments, a hard-stop is generated as the coupler 700 transitions from the coupled configuration 2B to the semi-coupled configuration 2C, which provides time for the coupler 700 to vent before the coupler 700 transitions to the de-coupled position 2A. In some embodiments, the hard stop may be generated by a stop-apparatus 400 or other apparatus. For example, one or more of the trigger 730, link assembly 885, and link bar 890 may be configured to provide a hard-stop. The hard-stop may be released and the coupler 700 may then be transitioned from the semi-coupled configuration 2C to the de-coupled position 2A.

FIG. 12a is a side view of a rapid-connect coupler 1200 in accordance with another embodiment; FIG. 12b is a rear view of the rapid-connect coupler 1200; and FIG. 13a is a cross section of the rapid-connect coupler 1200.

The rapid-connect coupler 1200 generally comprises a first architecture 1210 and a second architecture 1220, which are operable to move relative to each other along a central axis X. The first architecture 1210 comprises a sleeve 1205, one or more drive pin 1310, and a probe assembly 1315, which includes a coupling end 1220. Portions of the first and second architecture 1210, 1220 define a coupling head 1201 and a coupler body 1202.

The second architecture 1220 comprises a ball cage 1225, which defines a coupling orifice 1330. A female poppet assembly 1335 resides within the coupling orifice 1330. In an embodiment, the second architecture 1220 or portions thereof may be removable, and may be configured for easy and swift removal and replacement, which may be required due to damage or maintenance needs. The ball cage 1225 and sleeve 1205 may define a portion of the coupling head 1201.

A pneumatic actuating handle assembly 1230 may be coupled to the second architecture 720, which is configured to move the first architecture 1210 relative to the second architecture 1220. For example, the actuating handle assembly 1230 may be connected to the probe assembly 1315 by actuating connections 1385A, 1385B, which allows the probe assembly 1230 and sleeve 1305 to be slidably configured relative to the ball cage 1325 and housing 1255. The coupler 1200 may therefore be configured to move over a range of motion including configurations which may be analogous to configurations A, B and C which are depicted in FIGS. 2 and 3.

The actuating grip 1275 may be rotated between a first and second position, which causes the pneumatic actuating handle assembly 1230 to move the first and second architectures 1210, 1220 toward or away from each other. For example, coupler 1200 may be in a de-coupled configuration as depicted in FIG. 13a, (which may be analogous to configurations A, 2A). The actuating grip 1275 may be rotated to a second position and the sleeve 1305 may slide forward over balls 1345 disposed within the ball cage 1325. This may lock the balls 1345 in a position which is operable to couple the coupler 1200 to a receptacle 500 as described herein. Complementary poppets 1335, 540 in a receptacle 500 and the coupler 1200 may engage and allow fluid to flow between the receptacle 500 and the coupler 1200 as described herein. The coupler 1200 may then be in a coupled position, (which may be analogous to configurations B, 2B).

The actuating grip 1275 may be rotated back toward or to the first position which causes the sleeve 1305 and poppet 1335 to move backward toward the rear of the coupler 1200. As the coupler is moving from the coupled position toward the de-coupled position, a hard-stop may be generated, which stops the translation of the probe assembly 1315 within the housing 1255.

For example, as shown in FIG. 12a, a stop handle 1240 may extend within the housing 1255 and be rotatably biased via a pin 1246 and a handle-spring 1248. The stop handle 1240 may further include a stop head 1242 which is configured to engage with a probe notch 1244. In various embodiments, the stop handle 1240 may be configured to allow the coupler 1200 to move from the de-coupled position to the coupled position without obstruction; however, as the coupler 1200 moves from the coupled position back toward the decoupled position, the stop head 1242 may engage the probe notch 1244 and thereby create a hard-stop in a semi-coupled position (which may be analogous to configurations C, 2C).

As discussed herein, a semi-coupled configuration may be a configuration, where the coupler 1200 is configured to remain coupled to a receptacle 500 as complementary poppets 1335, 540 in the receptacle 500 and the coupler 1200 disengage. Recoil of the coupler 1200 caused by the discharge of fluid between the poppets 1335, 540, may be absorbed by the sustained coupling of the coupler 1200 and receptacle 500.

The hard-stop may be disengaged by pulling on the stop handle 1240 to rotate the stop head 1242 out of the probe notch 1244. The coupler 1200 may then transition into the de-coupled position. Transitioning of the coupler 1200 into the de-coupled position may occur once the hard-stop is released or may be achieved by rotating the actuating grip 1275.

Various embodiments discussed herein include elements or structures which are configured to provide a hard-stop in coupler 100, 700, 1200. Further embodiments, and the embodiments discussed herein may include various alternative structures or elements operable to provide a hard-stop. For example, a hard-stop may be achieved via one or more of a hook, hole, slot, shoulder, latch, brake, or the like. Such structures or elements may be internal or externally located and may generate a hard stop which may be released in various ways. For example, a hard stop may be released by a user actuating a handle, switch, button or the like. In some embodiments a hard-stop may be released by a timer, which may be electronic or mechanical. In some embodiments, a hard-stop may be automatically released or prevented from being released until defined conditions are present. For example, a hard stop may be maintained until fluid venting has ceased. Sensors, electronic or mechanical, may determine whether fluid venting has ceased.

Additionally, various structures or elements have been disclosed herein which are operable to selectively couple a coupler 100, 700, 1200 with a receptacle 500 (e.g., via a receptacle lip 520). Although balls 245, 1345 and a latch 845 are disclosed as being operable for such a coupling, various other suitable structures may be employed in various embodiments and the embodiments discussed herein. For example, a coupling may be achieved via one or more of a hook, hole, slot, shoulder, latch, brake, or the like.

Additionally, while embodiments of a coupler 100, 700, 1200 are disclosed herein as being configured to couple with receptacle 500, various embodiments may be adapted to coupled with a receptacle having other configurations. For example, various embodiments may relate to coupling with male and female receptacles and receptacles having holes, slots, lips, shoulders or threads both internally or externally.

Additionally, although specific embodiments have been illustrated and described herein, it will be appreciated by those of ordinary skill in the art and others, that a wide variety of alternate and/or equivalent implementations may be substituted for the specific embodiment shown and described without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein.

The invention claimed is:

1. A rapid-connect coupler comprising:
   a coupler body configured to convey a fluid from a first end to a second end;
   a coupling head at the first end of, and communicating with, the coupler body, the coupling head configured to transition between a coupled configuration and a de-coupled configuration; and
   a latching apparatus configured to allow the coupling head to transition from the de-coupled configuration to the coupled configuration without a hard-stop, and wherein the latching apparatus comprises a stop pin configured to provide a hard-stop between the coupled configuration and the de-coupled configuration by selectively arresting translation of a probe assembly on the second end of the coupler body.

2. The rapid-connect coupler of claim 1, wherein the coupling head is further configured by the latching apparatus to engage in a semi-coupled configuration when transitioning from the coupled configuration to the de-coupled configuration.

3. The rapid-connect coupler of claim 2, wherein the hard-stop is representative of the coupling head being engaged in the semi-coupled configuration.

4. The rapid-connect coupler of claim 1, wherein the coupling head is configured to couple with a receptacle and communicate fluid with the receptacle when the coupling head is in the coupled configuration; and
   wherein the coupling head is configured to prevent fluid communication between the receptacle and the coupling head when the coupling head is in the de-coupled configuration.

5. The rapid-connect coupler of claim 4, wherein the coupling head is further configured to take a semi-coupled configuration between the coupled configuration and the de-coupled configuration when transitioning from the coupled configuration to the de-coupled configuration,
   wherein the coupling head is configured to be coupled to the receptacle and prevent fluid communication between the receptacle and the coupling head when the coupling head is in the semi-coupled configuration.

6. The rapid-connect coupler of claim 5, wherein the coupling head is configured to vent fluid when the coupling head partially de-couples from the receptacle when transitioning from the coupled configuration to the semi-coupled configuration.

7. The rapid-connect coupler of claim 1, wherein the latching apparatus comprises a stop-release configured to release the hard-stop so that the coupling head is operable to transition to the de-coupled configuration.

8. The rapid-connect coupler of claim 6, wherein the coupling head is configured to vent fluid through a sleeve having penetrations to direct the path of fluid during venting.

9. The rapid connect coupler of claim 1, wherein the stop pin is a cylindrically shaped member.

10. A rapid-connect coupler comprising:
    a coupler body configured to convey a fluid from a first end to a second end;
    a probe assembly operable to translate axially within the coupler body;
    a coupling head at the first end of, and communicating with, the coupler body, the coupling head configured to transition between a coupled configuration and a de-coupled configuration; and
    a latching apparatus configured to allow the coupling head to transition from the de-coupled configuration to the coupled configuration without a hard-stop, wherein the latching apparatus comprises a stop member configured to provide a hard-stop at a semi-coupled configuration between the coupled configuration and the de-coupled configuration by selectively arresting translation of the probe assembly.

11. The rapid-connect coupler of claim 10, wherein the stop member is a cylindrical stop pin.

12. The rapid-connect coupler of claim 10, wherein the latching apparatus comprises a stop-release member configured to engage the stop member to release the hard-stop at the semi-coupled configuration.

13. The rapid-connect coupler of claim 12, wherein the stop-release member comprises a stop lever biased by a stop spring, wherein the stop-release member is configured to initiate engagement with the stop member to release the hard-stop by depression of the stop lever.

14. The rapid-connect coupler of claim 12, wherein the stop-release member comprises a timer configured to engage the stop member to release the hard-stop at the semi-coupled configuration based on timing information identified by the timer.

15. The rapid-connect coupler of claim 10, wherein the coupling head is configured to couple with a receptacle and communicate fluid with the receptacle when the coupling head is in the coupled configuration; and
    wherein the coupling head is configured to restrict fluid communication between the receptacle and coupling head when in the de-coupled configuration.

16. The rapid-connect coupler of claim 10, wherein the coupling head is configured to couple with a receptacle and restrict fluid communication between the receptacle and coupling head when in the semi-coupled configuration.

17. The rapid-connect coupler of claim 10, wherein the coupling head is configured to vent fluid before reaching the de-coupled configuration when transitioning from the coupled configuration to the semi-coupled configuration.

18. The rapid-connect coupler of claim 10, wherein the coupling head is configured to vent fluid at the semi-coupled configuration before reaching the de-coupled configuration.

19. A rapid-connect coupler comprising:
    a coupler body configured to convey a fluid;
    a coupling head at a first end of, and communicating with, the coupler body;
    a handle, the handle configured to transition the coupling head between a coupled configuration and a de-coupled configuration based on a movement of the handle in a first direction and second direction, respectively;
    a probe assembly operable to translate within a housing barrel;
    a stop apparatus configured to allow the handle to move in the first direction without engaging a positive stop at a stop position along the coupler body, and further configured to allow the handle to move in the second direction until engaging a positive stop at the stop position along the coupler body prior to a point at which the coupling head is transitioned to the de-coupled configuration, wherein the stop apparatus comprises a stop pin configured to selectively arrest translation of the probe assembly within the housing barrel in response to the stop pin engaging the positive stop at the stop position.

20. The rapid-connect coupler of claim 19, wherein the coupling head is further configured to take a semi-coupled configuration between the coupled configuration and the de-coupled configuration when the stop apparatus engages the positive stop at the stop position along the coupler body.

21. The rapid-connect coupler of claim 19, wherein the coupling head is configured to couple with a receptacle and communicate fluid with the receptacle when the coupling head is in the coupled configuration; and
    wherein the coupling head is configured to prevent fluid communication between the receptacle and the coupling head when the coupling head is in the de-coupled configuration.

* * * * *